(12) United States Patent
Loevlie

(10) Patent No.: US 11,472,736 B2
(45) Date of Patent: Oct. 18, 2022

(54) FIRE RETARDANT CEMENTITIOUS COMPOSITION

(71) Applicant: Kristian Loevlie, Golden, CO (US)

(72) Inventor: Kristian Loevlie, Golden, CO (US)

( * ) Notice: Subject to any disclaimer, the term of this patent is extended or adjusted under 35 U.S.C. 154(b) by 0 days.

(21) Appl. No.: 16/874,304

(22) Filed: May 14, 2020

(65) Prior Publication Data
US 2020/0361821 A1 Nov. 19, 2020

Related U.S. Application Data

(60) Provisional application No. 62/939,935, filed on Nov. 25, 2019, provisional application No. 62/899,510, filed on Sep. 12, 2019, provisional application No. 62/849,567, filed on May 17, 2019.

(51) Int. Cl.

| | | |
|---|---|---|
| *C04B 14/24* | (2006.01) | |
| *C04B 28/18* | (2006.01) | |
| *C04B 28/12* | (2006.01) | |
| *C04B 28/06* | (2006.01) | |
| *C04B 40/00* | (2006.01) | |
| *C04B 14/16* | (2006.01) | |
| *C04B 103/00* | (2006.01) | |
| *C04B 103/12* | (2006.01) | |
| *C04B 103/22* | (2006.01) | |

(52) U.S. Cl.
CPC .............. *C04B 14/24* (2013.01); *C04B 14/16* (2013.01); *C04B 28/065* (2013.01); *C04B 28/12* (2013.01); *C04B 28/18* (2013.01); *C04B 40/0042* (2013.01); *C04B 2103/0041* (2013.01); *C04B 2103/12* (2013.01); *C04B 2103/22* (2013.01)

(58) Field of Classification Search
CPC ......... C04B 14/16; C04B 14/24; C04B 28/12; C04B 28/065; C04B 28/18; C04B 40/0042; C04B 2103/0041; C04B 2103/12; C04B 2103/22
See application file for complete search history.

(56) References Cited

U.S. PATENT DOCUMENTS

| | | |
|---|---|---|
| 4,370,166 A | 1/1983 | Powers et al. |
| 5,718,759 A | 2/1998 | Stav et al. |
| 6,858,074 B2 | 2/2005 | Anderson et al. |
| 7,410,538 B2 | 8/2008 | Butler et al. |
| 8,394,744 B2 * | 3/2013 | Woytowich ............. C04B 28/02 507/269 |
| 9,908,814 B1 * | 3/2018 | Young ..................... C04B 18/02 |
| 2016/0115366 A1 * | 4/2016 | Maxson ................ E21B 21/062 166/292 |

FOREIGN PATENT DOCUMENTS

| | | | |
|---|---|---|---|
| CN | 103641420 A | * | 3/2014 |
| CN | 108503298 A | * | 9/2018 |

OTHER PUBLICATIONS

3M™ Glass Bubbles K Series S Series Safety Data Sheet (Year: 2009).*
3M™ Glass Bubbles HGS Series Safety Data Sheet (Year: 2019).*
International Search Report and Written Opinion for International (PCT) Patent Application No. PCT/US2020/032896, dated Jul. 28, 2020 13 pages.

* cited by examiner

*Primary Examiner* — Anthony J Green
(74) *Attorney, Agent, or Firm* — Sheridan Ross P.C.

(57) ABSTRACT

A cementitious composition is provided that includes:
(a) pumice;
(b) cement; and
(c) substantially spherical silica particles.

18 Claims, 3 Drawing Sheets

Fig. 1: Sample 1", Temperatures on the hot and cold sides of the specimen depending on time Fig. 2: Sample 2", Temperatures on the hot and cold sides of the specimen depending on time

US 11,472,736 B2

FIRE RETARDANT CEMENTITIOUS COMPOSITION

CROSS REFERENCE TO RELATED APPLICATION

The present application claims the benefits of U.S. Provisional Application Ser. No. 62/849,567, filed May 17, 2019; 62/899,510, filed Sep. 12, 2019; and 62/939,935, filed Nov. 25, 2019, all of the same title and each of which is incorporated herein by this reference in its entirety.

FIELD

The disclosure relates generally to cementitious compositions and particularly to fire retardant cementitious compositions.

BACKGROUND

Shotcrete, gunite, and other types of cement have a variety of applications. They typically consist of a mixture of cement, sand, and water. They can include other ingredients depending on the application.

SUMMARY

These and other needs are addressed by the various embodiments and configurations of the present invention.

A cementitious composition can include:
(a) pumice;
(b) cement; and
(c) substantially spherical silica particles.

The pumice can comprise highly vesicular rough textured volcanic glass typically having a $P_{80}$ range of from about 0.1 to about 65 mm.

The cement can be one or more of pozzolan-lime-cement, slag-lime cement, supersulfated cement, and calcium sulfoaluminate cement.

Most or all of the spherical silica particles can be hollow glass bubbles. In some formulations, at least about 50 and more commonly at least about 75% of the silica particles are hollow glass bubbles.

Typically at least about 50%, more typically at least most, and even more typically at least about 75% of the substantially spherical silica particles comprise soda-lime-borosilicate glass.

Most or all of the spherical silica particles comprise one or more gas-filled void(s) that is/are substantially sealed from the ambient atmosphere. In some formulations, at least about 50 and more commonly at least about 75% of the silica particles include one or more gas-filled void(s) that is/are substantially sealed from the ambient atmosphere.

At least about 50%, more commonly at least most and more commonly at least about 75% of the substantially spherical silica particles can have one or more of the following properties: a test pressure (psi) of at least about 100 but no more than about 35,000; a target fractional survival of at least about 80%; a minimum fractional survival of at least about 70%; a true density (g/cc) of at least about 0.05 but of no more than about 1; a thermal conductivity ($(W\text{-}m\text{-}1\text{-}K\text{-}1)$) at 70° F. (21° C.)) of at least about 0.025 but no more than about 0.5; a high level of thermal stability below about 1112° F. (600° C.); a packing density ranging from about 50 to about 70%; an oil absorption ranging from about 0.2 to about 0.6 g oil/cc of glass bubbles (per ASTM D281-84); a volatile content of no more than about 0.75% by wt.; an alkalinity ranging from about 0.4 to about 0.6 milliequivalents per gram; a dielectric constant ranging from about 1 to about 3 @ 100 MHz; and a $P_{10}$ size (microns by volume) of no more than about 15; a $P_{90}$ size (microns by volume) of no more than about 150; and a $P_{50}$ size (microns by volume) ranging from about 10 to about 100. The spherical silica particles can have a $P_{90}$ size of no more than about 150 microns by volume.

In one formulation, the composition comprises at least about 25 but no more than about 75% by mass pumice relative to the dry ingredients, at least about 25 but no more than about 75% by mass cement relative to the dry ingredients, and at least about 5 but no more than about 50% by mass substantially spherical silica particles relative to the dry ingredients.

The composition can include other constituents.

For example, the composition can include from about 0.5 to about 10% by weight of a hydrophobic additive relative to the dry ingredients to increase a hydrophobicity of the composition.

The composition can include from about 0.5 to about 10% by weight of a set accelerator relative to the dry ingredients.

The composition can include from about 0.5 to about 10% by weight of a set decelerator relative to the dry ingredients.

The present invention can provide a number of advantages depending on the particular application. For example, the composition can be resistant to combustion due to the high melting temperature of silica. The composition can be applied as a wet or dry mix. In the former case, the composition can be applied pneumatically and troweled or otherwise finished to a desired shape and texture. The composition can be a sprayable all-inorganic fireproofing material that has excellent adhesive bonding to a variety of surfaces, including both concrete and steel.

These and other advantages will be apparent from the disclosure of the invention(s) contained herein.

The expressions "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "binder" or "binding agent" is any material or substance that holds or draws other materials together to form a cohesive whole mechanically, chemically, by adhesion or cohesion.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present invention(s). These drawings, together with the description, explain the principles of the invention(s). The drawings simply illustrate preferred and alternative examples of how the invention(s) can be made and used and are not to be construed as limiting the invention(s) to only the illustrated and described examples. Further features and advantages will become apparent from the following, more detailed, description of the various embodiments of the invention(s), as illustrated by the drawings referenced below.

DETAILED DESCRIPTION

Figure 1:
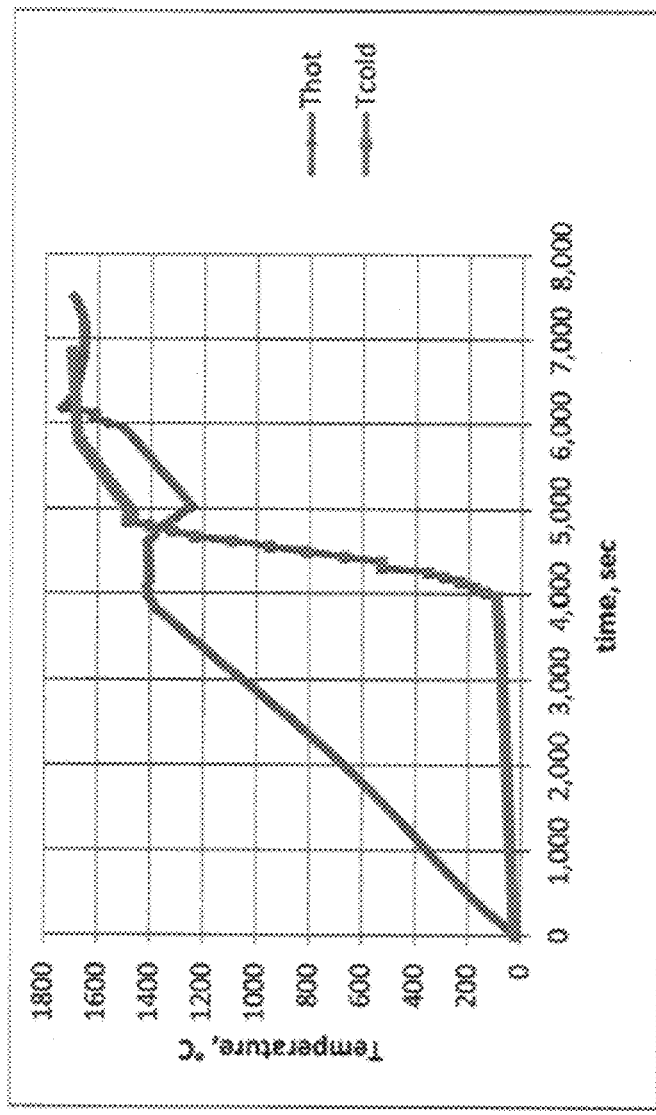
FIG. 1 is a plot of temperatures (vertical axis) on the cold and hot sides of sample 1" as a function of time (horizontal axis)

The cementitious composition of the present disclosure can have a high degree of fire retardancy. In one formulation, the cementitious composition comprises pumice, cement, silica particulates, and water.

The Dry Ingredients

Pumice

As will be appreciated, pumice is a powdered particulate, typically derived from crushed and ground volcanic rock. It generally comprises highly vesicular rough textured volcanic glass, which may or may not contain crystals. While pumice is preferred, other volcanic rock, such as scoria may be employed in certain applications. Most pumice contains tubular microvesicles that can impart a silky or fibrous fabric. The other form of vesicles is subspherical to spherical. The air-filled vesicles in this porous rock serves as a good insulator. A fine-grained version of pumice called pozzolan can be used in many applications.

The size range of the pumice varies by the application. While any size range is acceptable, very fine pumice will produce a more fluid impermeable composition while a coarser pumice will produce a more fluid permeable composition. Commonly, the $P_{80}$ size of the pumice ranges from about 0.1 to about 65 mm, more commonly from about 1 to about 45 mm, and even more commonly from about 2.5 to about 25 mm.

The composition typically includes at least about 25% and more typically at least about 30% but typically no more than about 75% and more typically no more than about 60% by mass pumice relative to the dry ingredients.

Cement

As will be further appreciated, cement is a binder that sets, hardens, and adheres to other materials to bind them together. The cement is usually inorganic, such as lime or calcium silicate-based, and can be characterized as either hydraulic or non-hydraulic, depending on the ability of the cement to set in the presence of water. Non-hydraulic cement (e.g., slaked lime or calcium oxide mixed with water) does not set in wet conditions or under water. Rather, it sets as it dries and reacts with carbon dioxide in the air. It is normally resistant to attack by chemicals after setting. Hydraulic cements (e.g., Portland cement) set and become adhesive due to a chemical reaction between the dry ingredients and water. The chemical reaction results in mineral hydrates that are not very water-soluble and so are quite durable in water and safe from chemical attack. This allows setting in wet conditions or under water and further protects the hardened material from chemical attack.

In one formulation, the cement is one or more of Portland blast-furnace slag cement, Portland-fly ash cement, Portland pozzolan cement, Portland silica fume cement, expansive cement, white blended cement, and very finely ground cement.

In one formulation, the cement is one or more of a pozzolan-lime cement, slag-lime cement, supersulfated cement, and calcium sulfoaluminate cement.

In one formulation, the cement is hydraulic cement that includes Belite ($2CaO.SiO_2$); Alite ($3CaO.SiO_2$), Tricalcium aluminate ($3CaO.Al_2O_3$), and Brownbillerite ($4CaO.Al_2O_3.Fe_2O_3$). While not wishing to be bound by any theory, the silicates are believed to be responsible for the cement's mechanical properties—the tricalcium aluminate and brownmillerite are believed to assist in formation of the liquid phase during the kiln sintering (firing).

The composition typically includes at least about 25% and more typically at least about 30% but typically no more than about 75% and more typically no more than about 60% by mass cement relative to the dry ingredients.

Silica Particles

Figure 3:
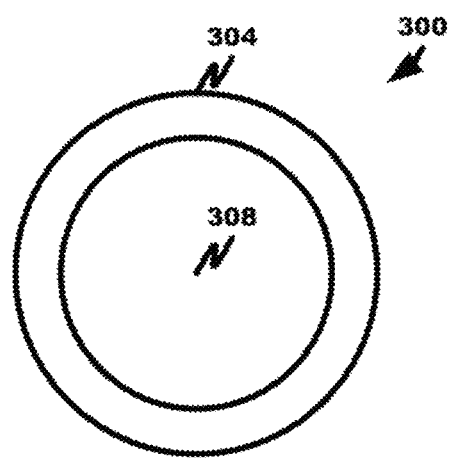
FIG. 3 is a cross-sectional view of a spherical particle according to an embodiment of this disclosure.

While any free-flowing silica particles can be used in the cementitious composition, with reference to FIG. 3 the silica particles 300 can be hollow, gas-filled spherical particles, such as engineered glass bubbles (such as the K Series, S Series, and iM Series Glass Bubbles™ of 3M™). The particles 300 can comprise an outer shell 304 of glass (e.g., soda-lime-borosilicate glass) surrounding an interior void or hollow volume 308 containing a gas. The volume is typically substantially or completely (hermetically) sealed from the ambient atmosphere. As will be appreciated, glass bubbles are low-density particles that can reduce part weight and enhance the fire retardancy properties of the cementitious composition. The spherical shape of glass bubbles can provide higher filler loading, lower viscosity of the composition, improved flow characteristics, and reduced shrinkage and warpage. Glass bubbles can also blend readily into the composition and adapt to a variety of production or application processes, including spraying, casting and molding. The chemically stable soda-lime-borosilicate glass composition of glass bubbles can provide excellent water resistance to create more stable emulsions. They are also non-combustible and nonporous, so they do not absorb other substances, such as moisture, and their low alkalinity can enhance compatibility of glass bubbles with other substances and provide stable viscosity and long shelf life. They also can produce stable voids, which results in low thermal conductivity and a low dielectric constant.

Typical properties for glass bubbles include: a test pressure (psi) commonly of at least about 100, more commonly of at least about 175, and even more commonly of at least about 250 and commonly no more than about 50,000, more commonly no more than about 35,000, and even more commonly no more than about 30,000; a target fractional survival commonly of at least about 80% and more commonly of at least about 85%; a minimum fractional survival commonly of at least about 70% and more commonly of at least about 75%; a true density (g/cc) commonly of at least about 0.05, more commonly of at least about 0.075, and even more commonly of at least about 0.10 and commonly of no more than about 1, more commonly of no more than about 0.80, and even more commonly of no more than about 0.75; a chemical resistance similar to that of soda-line-borosilicate glass; a thermal conductivity ((W-m-1-K-1) at 70° F. (21° C.)) commonly of at least about 0.025, more commonly of at least about 0.035, and even more commonly of at least about 0.045 and commonly no more than about 0.5, more commonly no more than about 0.4 m, more commonly no more than about 0.3, and even more commonly no more than about 0.25; a high level of thermal stability below about 1112° F. (600° C.); a packing density ranging from about 50 to about 70%; an oil absorption ranging from about 0.2 to about 0.6 g oil/cc of glass bubbles (per ASTM D281-84); a volatile content commonly of no more than about 0.75% by wt. and even more commonly of no more than about 0.50% by wt.; an alkalinity ranging from about 0.4 to about 0.6 milliequivalents per gram; a dielectric constant ranging from about 1 to about 3 @ 100 MHz; and a $P_{10}$ size (microns by volume) of no more than about 15, more commonly of no more than about 10, and more commonly of no more than about 7.5; a $P_{90}$ size (microns by volume) commonly of no more than about 150, more commonly of no more than about 125, and more commonly of no more than about 110; and a $P_{50}$ size (microns by volume) commonly ranging from about 10 to about 100, more commonly from about 12.5 to about 75, and even more commonly from about 15 to about 65.

By varying the type and amount of silica particles in the cementitious composition, the composition can be engineered for specific applications. For example, lower proportions of the silica particles relative to the other components can yield a heavier, more dense, and less fire retardant composition and higher proportions of the silica particles relative to the other components can yield a lighter, less dense, and more fire retardant composition.

The composition typically includes at least about 5% and more typically at least about 10% but typically no more than about 50% and more typically no more than about 30% by mass silica particles relative to the dry ingredients.

Other Additives

In some formulations, the cementitious composition can include a hydrophobic additive, such as an alkali metal or alkaline earth metal (e.g., sodium) silicate, to increase the hydrophobicity of the composition. In the absence of such an additive, the cementitious composition is substantially hydrophilic. The porosity and permeability of the (dry or wet mixed) composition can cause fluids (e.g., gases and water and other liquids) to pass substantially freely through the composition. The (dry or wet mixed) composition normally includes from about 0.5 to about 10% by wt. of the hydrophobic additive and more normally from about 1 to about 5% by wt. of the hydrophobic additive.

In some formulations, the cementitious composition can include a set accelerator or set decelerator. Set accelerators are normally divided into three groups; alkali or alkaline earth metal (e.g., sodium) silicates, alkali or alkaline earth metal (e.g., sodium) carbonates, aluminates and alkali-free set accelerators. Although set accelerators cause positive impacts, they can also create (especially sodium silicates and aluminates) certain downfalls in ultimate strength of the composition. Set decelerators known in the art can also or additionally be employed to retard or decelerate set time of the cementitious composition. Depending on the formulation and desired set strength and strength values, the composition normally includes from about 3 to about 10% by wt. of the set accelerator (or set decelerator).

In some formulations, the cementitious composition can also include coarse aggregate and admixtures to impart structural integrity. Depending on the formulation and desired set strength and strength values, the (dry or wet mixed) composition normally includes from about 0.5 to about 10% by wt. of the set accelerator (or set decelerator) and more normally from about 1 to about 5% by wt. of the set accelerator (or set decelerator).

Water

The amount of water can vary by the application to produce a desired viscosity.

The composition comprises typically at least about 10%, more commonly at least about 15%, and even more commonly at least about 25% but commonly no more than about 75%, more commonly no more than about 65%, more commonly no more than about 50%, and even more commonly no more than about 45% water by mass of the dry ingredients.

Preparation of Cementitious Composition

The cementitious composition can be dry or wet mixed. In dry mixing, the dry ingredients are mixed together and pneumatically premixed with water added at a nozzle. In wet mixing, both wet and dry ingredients are premixed in any order. Advantages of dry mixing include the ability to place the cementitious composition on irregular, vertical, and overhead surfaces that are difficult or expensive to form.

While not wishing to be bound by any theory, the high level of fire retardancy of the cementitious composition is believed to be due to the presence of silica particles coupled with the high level of porosity and permeability of the composition. Even when heated to high temperatures (e.g., 2000° F.), the composition can cool to the touch quickly (in a matter of minutes or even seconds) due to the rapid flow of air through the composition.

Applications

While the composition can be used in many applications, a particularly beneficial application is to fire-proof structural steel, such as by lining or coating structural members in many types of structures including dams, bridges, parking structures, buildings, and tunnels (ACI 546R-04). The composition can be sprayed onto the structural members and troweled to yield a desirable shape and texture. The ingredients can be mixed and pumped long distances to the point of application.

The composition can be combined with a water-resistant material to provide a fire and water-resistant composite material or combined with a hydrophobic additive to provide a fire and water-resistant material, which is particularly useful for commercial and residential building roofs and exterior walls. For example, the composition can replace the asphalt normally used in roofing applications.

Other applications for coatings of the composition include, without limitation, vehicle armor (e.g., composite composition and metal matrices), tiles, industrial plants (e.g., as coating to vessels and conduits), and vehicles (e.g., coatings to ship hulls and structural members).

EXPERIMENTAL

The following examples are provided to illustrate certain aspects, embodiments, and configurations of the disclosure and are not to be construed as limitations on the disclosure, as set forth in the appended claims. All parts and percentages are by weight unless otherwise specified.

Various tests were performed on the cementitious composition. The task was formulated as heating of one side of the submitted specimens up to 1600 to 1700 degrees Celsius for a period of 1-2 hours and recording the temperatures on the hot and cold sides of the sample.

Two samples of the cementitious composition, namely samples 1" and 2", were prepared and investigated for transient temperature fields. The samples were premixed within the compositional ranges set forth above and allowed to set in a mold to form a solid cast sample whitish in color.

The samples were arranged on the bottom of the furnace. The furnace was sealed and heating commenced. After each of the samples reached 1,650 to 1,700 degrees Celsius, the samples melted and damaged the lining of the furnace. During the heating of the samples, the temperatures of the hot and cold sides of the samples were measured by PtRh thermocouples supplied and calibrated by Engelhardt company.

Figure 2:
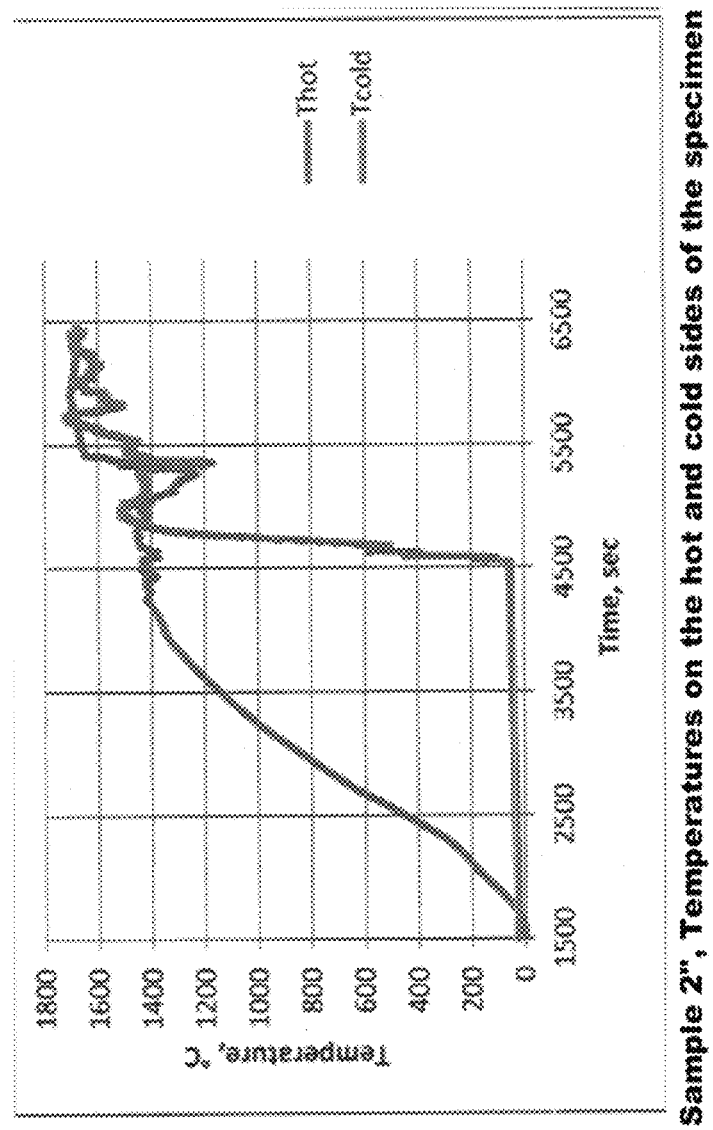
FIG. 2 is a plot of temperatures (vertical axis) on the cold and hot sides of sample 2" as a function of time (horizontal axis)

From FIGS. 1 and 2 one can see that up to a temperature of 1,400 degrees Celsius on the hot side of the samples the temperature on the cold side does not increase above 60 degrees Celsius. Both samples melted after reaching 1,400 degrees Celsius with the melt reacting with the lining of the furnace and damaging it. The sharp rise in the temperature after 1,400 degrees Celsius can be explained by extensive melting of the sample and the melt acquiring the applied to the top temperature. The drop in the temperature at the hot side starting at 1,400 degrees Celsius and ending at 1,600 degrees Celsius can be explained by extensive melting.

Judging from the observed damage on the side walls of the furnace above the samples, the melting of the samples was accompanied by extensive spitting of the samples and sparking. The melts were reacting very aggressively with the alumina lining materials on the bottom and sides of the furnace.

While not wishing to be bound by any theory, FIG. 1 appears to show thermal stability of the samples up to a hot-side temperature of about 1400 degrees Celsius. At this temperature, one or more components of the cementitious composition appeared to melt and/or react with the furnace liner as shown by the plateau and valley in the hot-side temperature profile. The phase change and/or reaction was endothermic. At this point, the cold-side temperature rapidly increased, indicating that the structure of the cementitious composition began to change or deteriorate. As a result, the hot-side and cold-side temperatures were substantially the same after about 4,750 seconds.

Various tests were performed on the cementitious composition to simulate its resistant to a fire. A sample of the cementitious composition was prepared by being premixed within the compositional ranges set forth above and allowed to set in a mold to form a solid hand-cast tabular panel-shaped sample whitish in color and measuring 7/16" in thickness, 5¾" in width and 5¾" in length with rounded corners. The sample was allowed to dry and cure fully.

A basic heat test of the sample was performed by applying a constant localized high temperature directly to the center of the panel for an extended period of time. The heat source utilized was a portable torch (Turbo-Lite) fueled by a MAP-Pro gas cylinder (manufactured by Benzomatic). The portable torch was horizontally restrained by a custom fabricated adjustable steel frame and manually positioned so that the flame of the torch was approximately 1" away from the panel center. The sample panel rested on a steel diamond plate work table and was positioned near vertical (inclined approximately 10 degrees) supported by a steel angle member behind and a spare fireproof material block in front. The flame from the torch was oriented approximately 45 degrees relative to the panel surface.

Given that the altitude of the test was 7,525 feet above mean sea level, an independent check of the torch temperature prior to the heat test was performed to confirm that the altitude did not affect significantly the heat output of the portable torch. The torch heated up an edge of a scrap metal plate to a bright yellow color, correlating to an approximate heated temperature of 2,000 degrees Fahrenheit based on readily available steel color charts.

The torch flame was applied to the sample at 8:41 am and remained in continuous uninterrupted thermal contact with the panel for a full 2 hours with the test ending at 10:41 am. During the test, several temperature measurements were measured via a hand-held infrared thermometer (Extech IR Thermometer 42570) at different points on the hot-side and cold-side of the sample.

The sample was exposed to a significant localized heat source that consistently measured above 2,000 degrees Fahrenheit. The temperature was observed to dissipate relatively quickly away from the direct heat, with the rear surface temperature hovering just above 800 degrees Fahrenheit, resulting in a temperature drop of roughly 1,200 degrees Fahrenheit over the 7/16" panel thickness.

The sample was visually monitored throughout the test and only a few minor observations were noted during the two hour test. Early on (approximately 4 minutes into the test), a hairline circular crack developed following the approximate limits of torch flame. The crack was observed both on the front and on the rear surfaces. At 9:06 am (test duration of 25 minutes), a second vertical hairline crack was noted extending downward from the circular thermal crack. As the test continued, the crack width increased slightly. In addition to the minor thermal cracking, there was some surface staining in the area of the direct torch flame on the front surface, but no visible degradation or material loss of the fireproofing panel.

Apart from thermal cracking and surface staining, the sample was thermally stable over the temperature regime and time tested. The thin 7/16" tabular sample remained intact during and after the test. This experiment demonstrates the thermal insulating properties of the cementitious composition at relatively high temperatures.

An underground tunnel in a mine had a problem with volcanically heated groundwater flowing into the excavation exposing workers to extremely high temperatures. A hydrophobic cementitious composition comprising a hydrophobic additive and set accelerator as set forth above was sprayed onto the tunnel walls and troweled to yield a liner having a

What is claimed is:

1. A cementitious composition, comprising:
   (a) at least about 35% and no more than about 75% by mass of pumice relative to dry ingredients;
   (b) at least about 25% and no more than about 75% by mass of cement relative to the dry ingredients; and
   (c) and at least about 5% and no more than about 50% by mass of substantially spherical silica particles relative to the dry ingredients, wherein at least most of the substantially spherical silica particles comprise hollow glass bubbles.

2. The cementitious composition of claim 1, wherein the hollow glass bubbles comprise soda-lime-borosilicate having a gas-filled void that is substantially sealed from an ambient atmosphere.

3. The cementitious composition of claim 1, comprising at least about 30% and no more than about 60% by mass of the cement relative to the dry ingredients, and at least about 10% and no more than about 30% by mass of the substantially spherical silica particles relative to the dry ingredients.

4. The cementitious composition of claim 1, wherein the pumice comprises highly vesicular rough textured volcanic glass having a $P_{80}$ range of from about 0.1 mm to about 65 mm and wherein the cement is one or more of pozzolan-lime-cement, slag-lime cement, supersulfated cement, and calcium sulfoaluminate cement, and wherein the substantially spherical silica particles have a $P_{90}$ size of no more than about 150 microns by volume.

5. The cementitious composition of claim 1, wherein the at least most of the substantially spherical silica particles have the following properties: a test pressure (psi) of at least about 100 but no more than about 35,000; a target fractional survival of at least about 80%; a minimum fractional survival of at least about 70%; a true density (g/cc) of at least about 0.05 but of no more than about 1; a thermal conductivity ((W-m-1-K-1) at 70° F. (21° C.)) of at least about 0.025 but no more than about 0.5; a high level of thermal stability below about 1112° F. (600° C.); a packing density ranging from about 50 to about 70%; an oil absorption ranging from about 0.2 to about 0.6 g oil/cc of glass bubbles (per ASTM D281-84); a volatile content of no more than about 0.75% by wt.; an alkalinity ranging from about 0.4 to about 0.6 milliequivalents per gram; a dielectric constant ranging from about 1 to about 3 @ 100 MHz; and a $P_{10}$ size (microns by volume) of no more than about 15; a $P_{90}$ size (microns by volume) of no more than about 150; and a $P_{50}$ size (microns by volume) ranging from about 10 to about 100.

6. The cementitious composition of claim 1, wherein the cementitious composition is thermally stable up to at least 1400° C.

7. A cementitious composition, comprising:
   (a) pumice, wherein the pumice comprises highly vesicular rough textured volcanic glass having a $P_{80}$ range of from about 0.1 mm to about 65 mm;
   (b) cement; and
   (c) substantially spherical silica particles, wherein at least most by volume of the substantially spherical silica particles comprise hollow glass bubbles, wherein the substantially spherical silica particles have a $P_{90}$ size of no more than about 150 microns.

8. The cementitious composition of claim 7, wherein at least about 50% of the substantially spherical silica particles each comprise soda-lime-borosilicate glass having a gas-filled void that is substantially sealed from an ambient atmosphere.

9. The cementitious composition of claim 7, comprising at least about 25% and no more than about 75% by mass of the pumice relative to the dry ingredients, at least about 25% and no more than about 75% by mass of the cement relative to the dry ingredients, and at least about 5% and no more than about 50% by mass of the substantially spherical silica particles relative to the dry ingredients.

10. The cementitious composition of claim 7, wherein the cement is one or more of pozzolan-lime-cement, slag-lime cement, supersulfated cement, and calcium sulfoaluminate cement.

11. The composition of claim 8, wherein at least 50% of the substantially spherical silica particles have the following properties: a test pressure (psi) of at least about 100 but no more than about 35,000; a target fractional survival of at least about 80%; a minimum fractional survival of at least about 70%; a true density (g/cc) of at least about 0.05 but of no more than about 1; a thermal conductivity ((W-m-1-K-1) at 70° F. (21° C.)) of at least about 0.025 but no more than about 0.5; a high level of thermal stability below about 1112° F. (600° C.); a packing density ranging from about 50 to about 70%; an oil absorption ranging from about 0.2 to about 0.6 g oil/cc of glass bubbles (per ASTM D281-84); a volatile content of no more than about 0.75% by wt.; an alkalinity ranging from about 0.4 to about 0.6 milliequivalents per gram; a dielectric constant ranging from about 1 to about 3 @ 100 MHz; and a $P_{10}$ size (microns by volume) of no more than about 15; and a $P_{50}$ size (microns by volume) ranging from about 10 to about 100.

12. A sprayable cementitious composition, comprising:
    (a) at least about 30% and no more than about 75% by mass of pumice relative to dry ingredients;
    (b) at least about 25% and no more than about 75% by mass of cement relative to the dry ingredients;
    (c) at least about 5% and no more than about 50% by mass of substantially spherical silica particles relative to the dry ingredients, wherein at least most of the substantially spherical silica particles comprise hollow glass bubbles;
    (d) at least about 0.5% and no more than about 10% by mass of a hydrophobic additive relative to the dry ingredients; and
    (e) at least 15% and no more than about 75% by mass of water relative to the dry ingredients.

13. The sprayable cementitious composition of claim 12, wherein at least about 75% of the substantially spherical silica particles each comprise a gas-filled void that is substantially sealed from an ambient atmosphere and wherein at least about 75% of the substantially spherical silica particles comprise soda-lime-borosilicate glass.

14. The sprayable cementitious composition of claim 12, wherein the pumice comprises highly vesicular rough textured volcanic glass having a $P_{80}$ range of from about 0.1 mm to about 65 mm and wherein the cement is one or more of pozzolan-lime-cement, slag-lime cement, supersulfated cement, and calcium sulfoaluminate cement, wherein the substantially spherical silica particles have a $P_{90}$ size of no more than about 150 microns by volume.

15. The sprayable cementitious composition of claim 12, wherein at least 50% of the substantially spherical silica particles have the following properties: a test pressure (psi) of at least about 100 but no more than about 35,000; a target fractional survival of at least about 80%; a minimum fractional survival of at least about 70%; a true density (g/cc) of at least about 0.05 but of no more than about 1; a thermal conductivity ((W-m-1-K-1) at 70° F. (21° C.)) of at least about 0.025 but no more than about 0.5; a high level of thermal stability below about 1112° F. (600° C.); a packing density ranging from about 50 to about 70%; an oil absorption ranging from about 0.2 to about 0.6 g oil/cc of glass bubbles (per ASTM D281-84); a volatile content of no more than about 0.75% by wt.; an alkalinity ranging from about 0.4 to about 0.6 milliequivalents per gram; a dielectric constant ranging from about 1 to about 3 @ 100 MHz; and a $P_{10}$ size (microns by volume) of no more than about 15; a $P_{90}$ size (microns by volume) of no more than about 150; and a $P_{50}$ size (microns by volume) ranging from about 10 to about 100.

16. The sprayable cementitious composition of claim 12 further comprising from about 0.5% to about 10% by weight of a set accelerator relative to the dry ingredients.

17. The sprayable cementitious composition of claim 12 further comprising from about 0.5% to about 10% by weight of a set decelerator relative to the dry ingredients.

18. The sprayable cementitious composition of claim 12, comprising at least about 35% by mass of the pumice relative to the dry ingredients.

* * * * *